United States Patent
Kim et al.

(10) Patent No.: US 9,598,136 B1
(45) Date of Patent: Mar. 21, 2017

(54) SELF BALANCING SCOOTER STEERED WITH THIGH

(71) Applicant: ROBO3 Co., Ltd., Seoul (KR)

(72) Inventors: Joon-Hyung Kim, Seoul (KR); Hwa Sung Jun, Seoul (KR)

(73) Assignee: ROBO3 CO., LTD., Nonhyeon-Ro, Gangnam-Gu, Seoul (KR)

( * ) Notice: Subject to any disclaimer, the term of this patent is extended or adjusted under 35 U.S.C. 154(b) by 0 days.

(21) Appl. No.: 14/930,629

(22) Filed: Nov. 2, 2015

(51) Int. Cl.
*B62D 61/00* (2006.01)
*B62K 21/00* (2006.01)
*B62K 3/00* (2006.01)
*B62K 19/36* (2006.01)
*B62K 15/00* (2006.01)

(52) U.S. Cl.
CPC .............. *B62K 21/00* (2013.01); *B62K 3/007* (2013.01); *B62K 15/00* (2013.01); *B62K 19/36* (2013.01); *B62K 2015/001* (2013.01); *B62K 2202/00* (2013.01); *B62K 2207/00* (2013.01); *B62K 2208/00* (2013.01)

(58) Field of Classification Search
CPC ....................................................... B62K 3/007
USPC ............................................................ 180/218
See application file for complete search history.

(56) References Cited

U.S. PATENT DOCUMENTS

| | | | | |
|---|---|---|---|---|
| 6,561,294 B1* | 5/2003 | Kamen | .................. | B62D 37/00 180/21 |
| 7,004,271 B1* | 2/2006 | Kamen | .................. | B62D 37/00 180/21 |
| 7,303,032 B2* | 12/2007 | Kahlert | .................. | B62K 3/007 180/21 |
| 7,784,206 B2* | 8/2010 | Trainer | .................. | B62K 3/007 280/211 |
| 8,074,388 B2* | 12/2011 | Trainer | ............... | G09F 15/0087 280/211 |
| 8,322,478 B2* | 12/2012 | Kim | ....................... | B62K 3/007 180/218 |
| 8,725,355 B2* | 5/2014 | Quick | .................... | B62K 3/007 180/22 |
| 9,156,516 B2* | 10/2015 | Kahlert | .................... | B62H 1/12 |
| 9,339,431 B2* | 5/2016 | Menard | .................... | A61H 3/04 |
| 2006/0086544 A1* | 4/2006 | Kamen | .................. | B62D 37/00 180/21 |
| 2006/0202439 A1* | 9/2006 | Kahlert | .................. | B62K 3/007 280/47.24 |

(Continued)

*Primary Examiner* — Joseph Rocca
*Assistant Examiner* — Conan Duda
(74) *Attorney, Agent, or Firm* — John K. Park; Park Law Firm

(57) ABSTRACT

A self balancing scooter steered with thighs is provided, which includes: two wheels having motors mounted; a motor housing for mounting the motors therein so as to allow rotary shafts of the motors to be located linearly; a footrest disposed on top of the motor housing; an erecting housing located on top of the footrest and having a battery and a controller mounted, the controller being adapted to control driving and direction change of the self balancing scooter, a cover disposed on top thereof, and an insertion hole formed on the center of the cover; a saddle having a seatpost fitted to the insertion hole of the cover; and a thigh steering plate mounted just on the underside of the saddle through the seatpost so as to be turned in left and right sides through the thighs of the rider sitting on the saddle to perform the direction change.

1 Claim, 9 Drawing Sheets

(56) References Cited

U.S. PATENT DOCUMENTS

| | | | | |
|---|---|---|---|---|
| 2008/0209783 | A1* | 9/2008 | Trainer | B62K 3/007 40/606.02 |
| 2008/0245594 | A1* | 10/2008 | Ishii | B62D 37/00 180/218 |
| 2009/0115149 | A1* | 5/2009 | Wallis | B60N 2/002 280/6.159 |
| 2010/0114468 | A1* | 5/2010 | Field | B60N 2/045 701/124 |
| 2010/0250040 | A1* | 9/2010 | Yamano | B62K 3/007 701/22 |
| 2011/0221160 | A1* | 9/2011 | Shaw | B62K 3/007 280/205 |
| 2011/0303475 | A1* | 12/2011 | Kim | B62K 3/007 180/218 |
| 2014/0020962 | A1* | 1/2014 | Quick | B62K 3/007 180/6.5 |
| 2014/0069733 | A1* | 3/2014 | Kahlert | B62H 1/12 180/218 |
| 2014/0091543 | A1* | 4/2014 | Menard | A61H 3/04 280/87.021 |
| 2015/0239499 | A1* | 8/2015 | Lan | G01L 1/22 701/41 |
| 2016/0031515 | A1* | 2/2016 | Andreev | B60G 21/05 180/218 |
| 2016/0158079 | A1* | 6/2016 | Pompei | A61G 5/1056 296/65.04 |
| 2016/0176469 | A1* | 6/2016 | Zhang | B62K 3/007 74/512 |

* cited by examiner

SELF BALANCING SCOOTER STEERED WITH THIGH

BACKGROUND OF THE INVENTION

Field of the Invention

The present invention relates to a self balancing scooter, and more particularly, to a self balancing scooter steered with thighs that can allow left and right driving directions to be steered with a rider's thighs through a thigh steering plate located between his or her thighs, without using any hands, thus allowing his or her both hands to be freely used while being driven.

Background of the Related Art

FIG. 1 is a perspective view showing a conventional two-wheel self balancing scooter. As shown in FIG. 1, first, the conventional two-wheel self balancing scooter is driven with the two wheels 20 disposed in left and right sides thereof, while the two wheels 20 are keeping their balance in real time during driving. So as to maintain the balance between the two wheels 20, while various electric processors like a gyro sensor are being controlled under a controller, the speed of the two wheels is regulated in real time according to inclinations of a rider's body, thus conducting forward and backward driving and left and right direction changes.

As shown in FIG. 1, for example, if the rider takes manipulation handles 91 to incline his or her body forwardly to a given angle in the state of riding on the two wheel self balancing scooter, the inclination of the rider's body is in real time read through a controller on which a variety of sensors like a gyro sensor are collected, and the two wheels 20 are driven in the direction of the inclination to offset the inclination, so that the scooter can change the position, while being not overturned forwardly due to the generation of the inclination, thus achieving safe driving.

Accordingly, the self balancing scooter can maintain its erecting state, without losing its balance, and it can be driven forwardly and backwardly according to the inclination directions of his or her body. Further, as the manipulation handles 91 located on the left and right sides of the self balancing scooter are turned appropriately, the direction changes of the scooter can be achieved.

According to the conventional two-wheel self balancing scooter, however, the rider takes the manipulation handles 91 and rides on the scooter in the state of standing upright, so that, unfortunately, his or her hands are not freely used during driving. On the other hand, as shown in FIG. 1, a fixing shaft is straightly disposed on the two-wheel self balancing scooter, and the manipulation handles 91 are mounted on the upper portion of the fixing shaft 90, so that the whole volume of the two-wheel self balancing scooter can be bulky, thus making it hard to be kept in the trunk of a vehicle to cause many difficulties in the transportation and storage thereof.

SUMMARY OF THE INVENTION

Accordingly, the present invention has been made in view of the above-mentioned problems occurring in the prior art, and it is an object of the present invention to provide a self balancing scooter steered with thighs that is provided with a thigh steering plate disposed between a rider's thighs in such a manner as to be turned to left and right sides, while being driven, without having any manipulation handles for changing driving directions, so that the rider's both hands are freely used, while the driving directions are being changed.

To accomplish the above-mentioned object, according to the present invention, there is provided a self balancing scooter steered with thighs, including: two wheels having motors mounted thereon; a motor housing for mounting the motors therein in such a manner as to allow rotary shafts of the motors to be located linearly; a footrest disposed on top of the motor housing to place a rider's feet thereon; an erecting housing located on top of the footrest and having a battery and a controller mounted therein, the controller being adapted to control driving and direction change of the self balancing scooter, a cover disposed on top thereof, and an insertion hole formed on the center of the cover; a saddle having a seatpost fitted to the insertion hole of the cover; and a thigh steering plate mounted just on the underside of the saddle through the seatpost in such a manner as to be turned in left and right sides through the thighs of the rider sitting on the saddle to perform the direction change.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a self balancing scooter steered with thighs according to the present invention will be in detail given with reference to the attached drawing.

According to the present invention, a self balancing scooter steered with thighs is provided with a thigh steering plate manipulated by a rider's thighs upon the direction change of the scooter in the state where the rider rides on the scooter, so that his or her both hands are freely used while the scooter is being driven.

Figure 1:
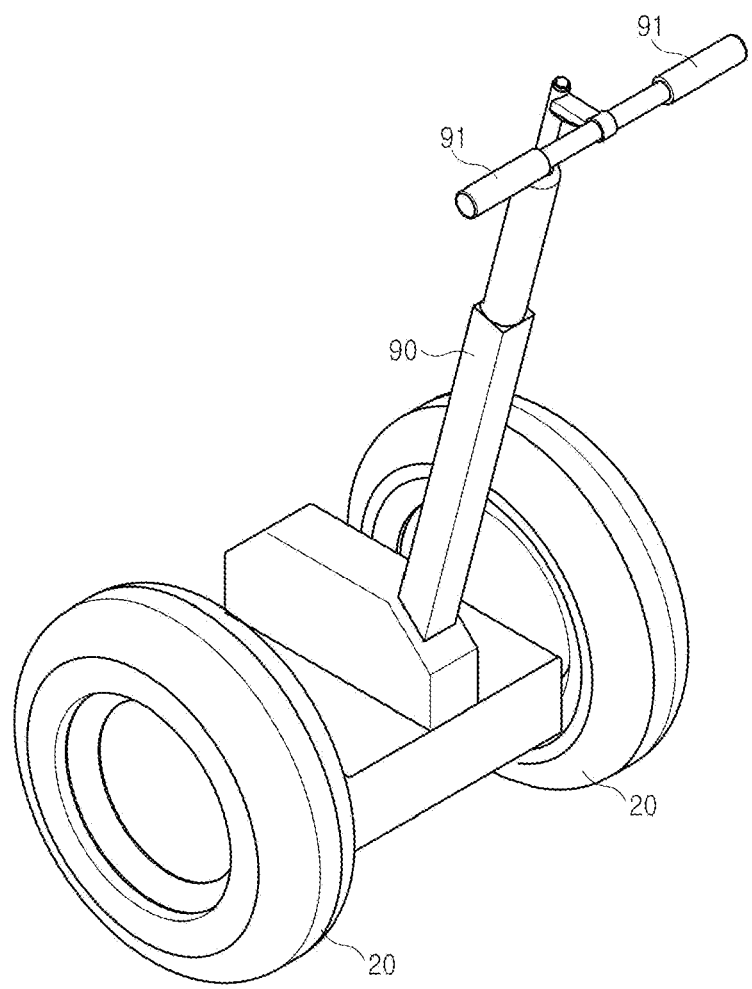
FIG. 1 is a perspective view showing a conventional two-wheel self balancing scooter.
Figure 2:
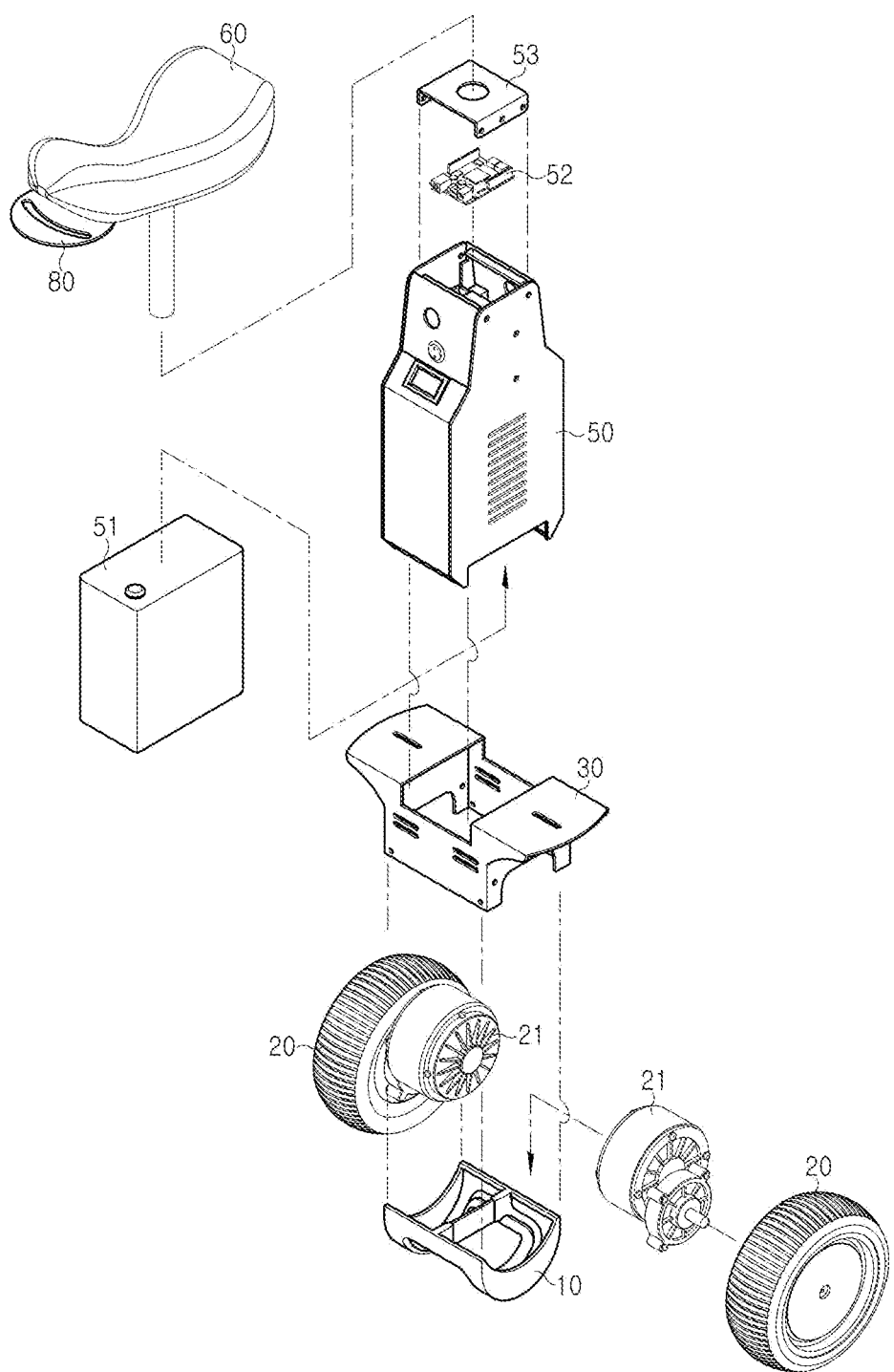
FIG. 2 is an exploded perspective view showing a self balancing scooter steered with thighs according to the present invention.
Figure 3:
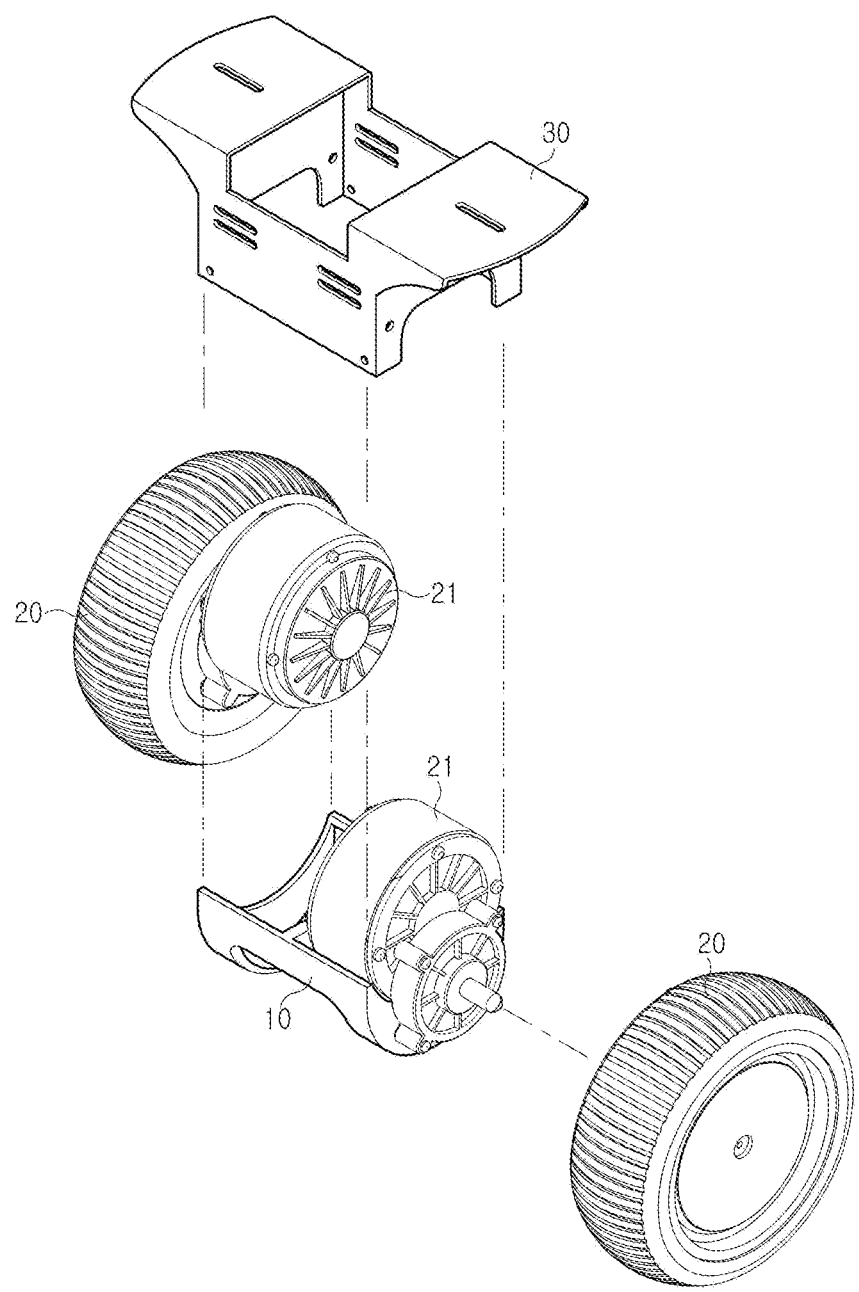
FIG. 3 is a perspective view showing a motor housing and a footrest of the self balancing scooter steered with thighs according to the present invention.

FIG. 2 is an exploded perspective view showing a self balancing scooter steered with thighs according to the present invention, and FIG. 3 is a perspective view showing a motor housing and a footrest of the self balancing scooter steered with thighs according to the present invention. As shown in FIGS. 2 and 3, a self balancing scooter steered with thighs according to the present invention has two motors 21, two wheels 20 mounted on the shafts of the motors 21, and a motor housing 10 for mounting the two motors 21 therein in such a manner as to allow rotary shafts of the motors 21 to be located linearly.

Further, a footrest 30 is disposed on top of the motor housing 10 to place a rider's feet thereon. The footrest 30 desirably includes concave and convex portions or a non-slip material formed thereon to generate a frictional force from the soles of the rider's feet, so that he or she can take a stable posture.

Figure 4:
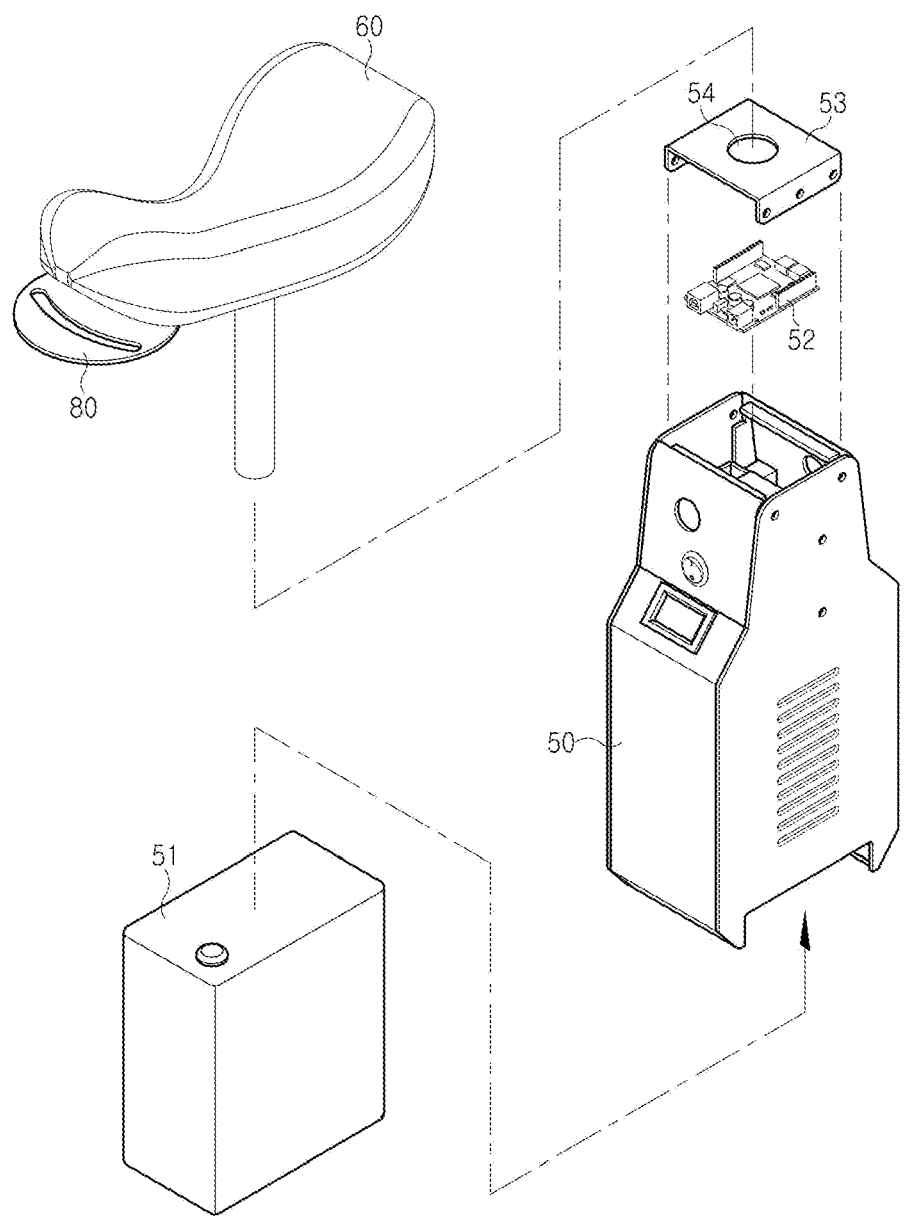
FIG. 4 is a perspective view showing an erecting housing of the self balancing scooter steered with thighs according to the present invention.

FIG. 4 is a perspective view showing an erecting housing of the self balancing scooter steered with thighs according to the present invention. As shown in FIG. 4, an erecting housing 50 is located on top of the footrest 30 and has a battery 51 mounted therein to drive the motors 21. Further, the erecting housing 50 has a power applying switch, a battery charging plug, and a display for displaying the driving state, the rest amount of the battery 51 and malfunctions mounted on one side surface thereof.

On the other hand, as shown in FIG. 4, the erecting housing 50 has a controller 52 mounted on the upper portion thereof, on which a variety of sensors like a gyro sensor are collected, to control driving and direction changes of the self balancing scooter, a cover 53 disposed on top thereof, and an insertion hole 54 formed on the center of the cover 53 to fit a saddle 60 whose height is adjustable thereto.

Figure 5:
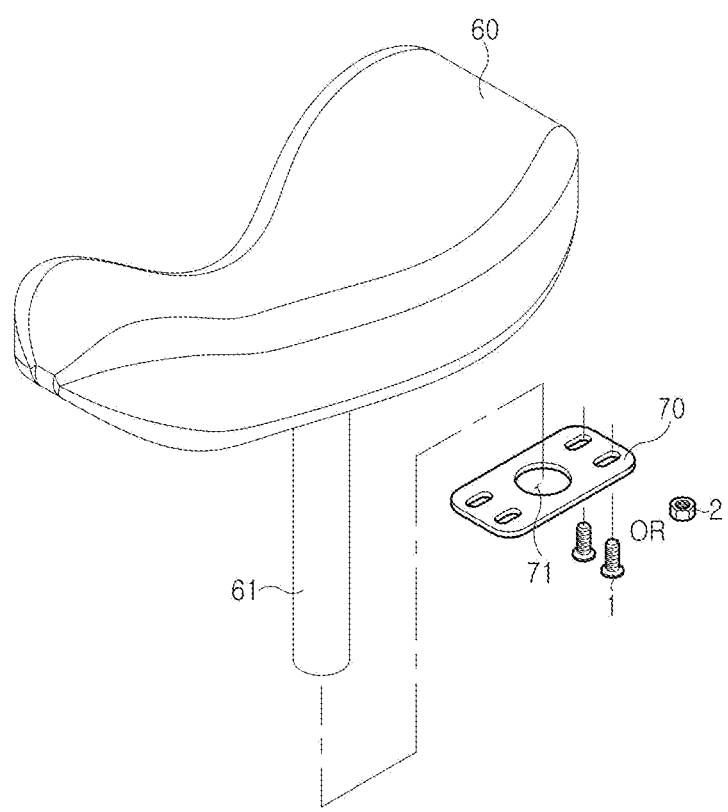
FIG. 5 is a perspective view showing a saddle and a seatpost of the self balancing scooter steered with thighs according to the present invention.
Figure 6:
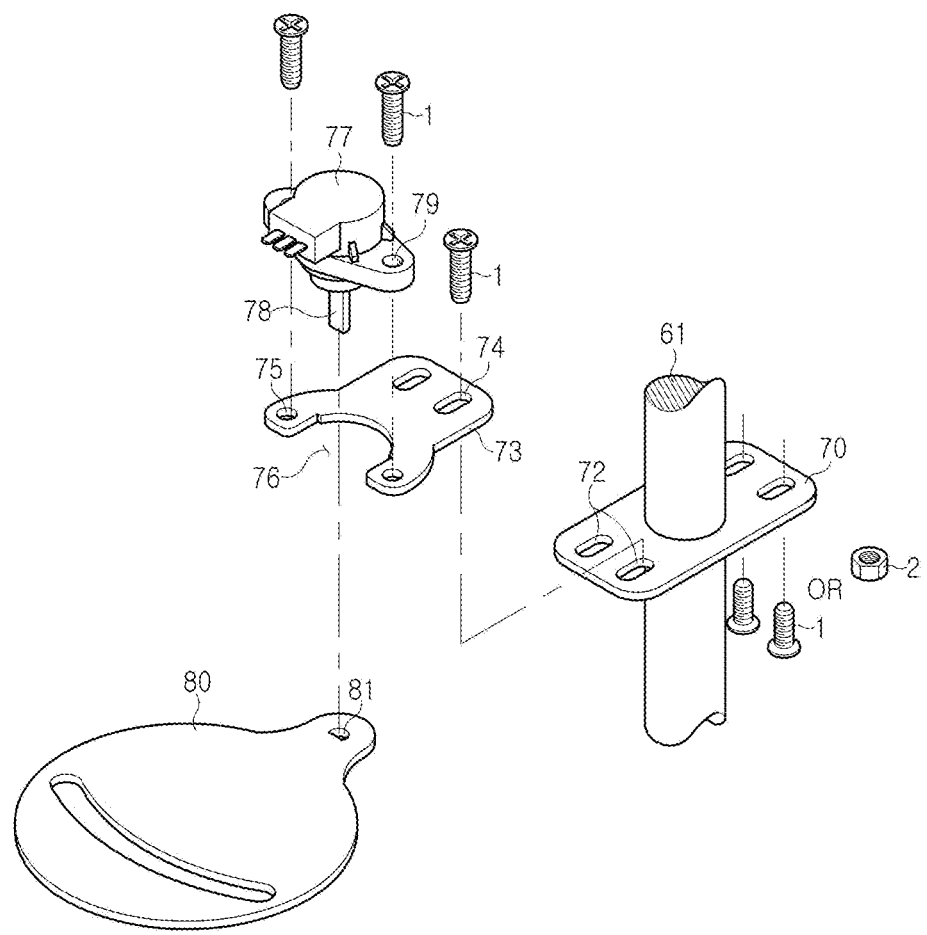
FIG. 6 is an exploded perspective view showing a structure for installing a thigh steering plate of the self balancing scooter steered with thighs according to the present invention.
Figure 7:
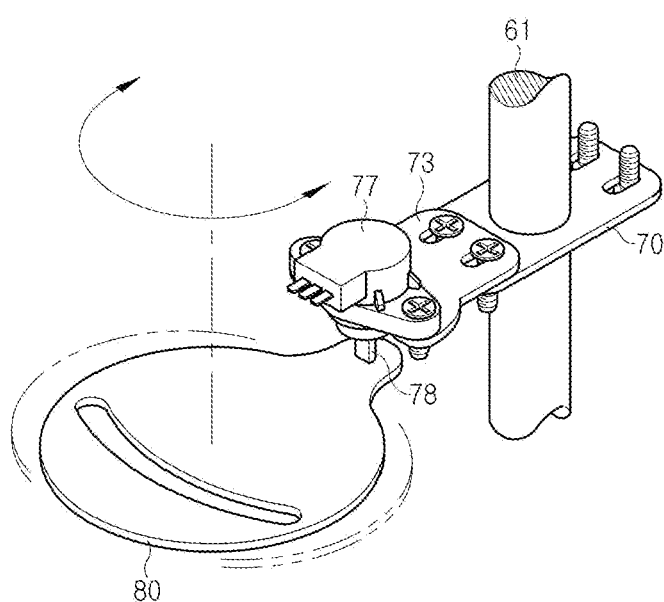
FIG. 7 is a perspective view showing the coupled state of the thigh steering plate of the self balancing scooter steered with thighs according to the present invention.

FIG. 5 is a perspective view showing a saddle and a seatpost of the self balancing scooter steered with thighs according to the present invention, FIG. 6 is an exploded perspective view showing a structure for installing a thigh steering plate of the self balancing scooter steered with thighs according to the present invention, and FIG. 7 is a perspective view showing the coupled state of the thigh steering plate of the self balancing scooter steered with thighs according to the present invention. As shown in FIG. 5, first, a seatpost 61, which serves to support the underside of the saddle 60, is passed through an insertion hole 71 formed on the center of a seatpost fixing stand 70, and fixing means like bolts 1 or nuts 2 are fastened to first fastening holes 72 formed around the insertion hole 71 of the seatpost fixing stand 70, thus allowing the seatpost fixing stand 70 to be rigidly fixed to the underside of the saddle 60.

At this time, the seatpost fixing stand 70 can be fixed to the underside of the saddle 60 through the fastening of the fixing means like the bolts 1 or the nuts 2 to the underside of the saddle 60, and otherwise, the seatpost fixing stand 70 can be fixed to the underside of the saddle 60 through the fastening of the fixing means like the bolts 1 or the nuts 2 to a steel plate after the steel plate has been attached to the underside of the saddle 60.

On the other hand, as shown in FIG. 6, a gauge mounting plate 73 is screw-coupled to the two or more first fastening holes 72 formed on the seatpost fixing stand 70 through bolts 1, and next, the bolts 1 are passed sequentially through second fastening holes 74 formed on one side of the gauge mounting plate 73 and the first fastening holes 72 of the seatpost fixing stand 70 and screw-coupled thereto. A mounting groove 76 is formed on the opposite side to the second fastening holes 74 of the gauge mounting plate 73 and coupled to a shuttle gauge 77 operating in a dialing way.

So as to couple the shuttle gauge 77 to the gauge mounting plate 73, as shown in FIG. 6, fastening holes 79 formed on both sides of the shuttle gauge 77 are laid on third fastening holes 75 formed on both sides of the mounting groove 76 of the gauge mounting plate 73, and next, bolts 1 are passed sequentially through the fourth fastening holes 79 and the third fastening holes 75 and screw-coupled thereto.

On the other hand, as shown in FIGS. 6 and 7, a fitting member 78 formed on the center of the shuttle gauge 77 is inserted into a fitting hole 81 formed on one side of the thigh steering plate 80, so that if the thigh steering plate 80 is turned in left and right sides through the rider's thighs, as shown in FIG. 7, the fitting member 78 of the shuttle gauge 77 is cooperatively operated with the movements of the thigh steering plate 80 and then moved in position. Accordingly, the shuttle gauge 77 operating in the dialing way transmits a direction change signal to the controller 52 mounted in the erecting housing 50, thus allowing the self balancing scooter to be changed in direction.

Figure 8:
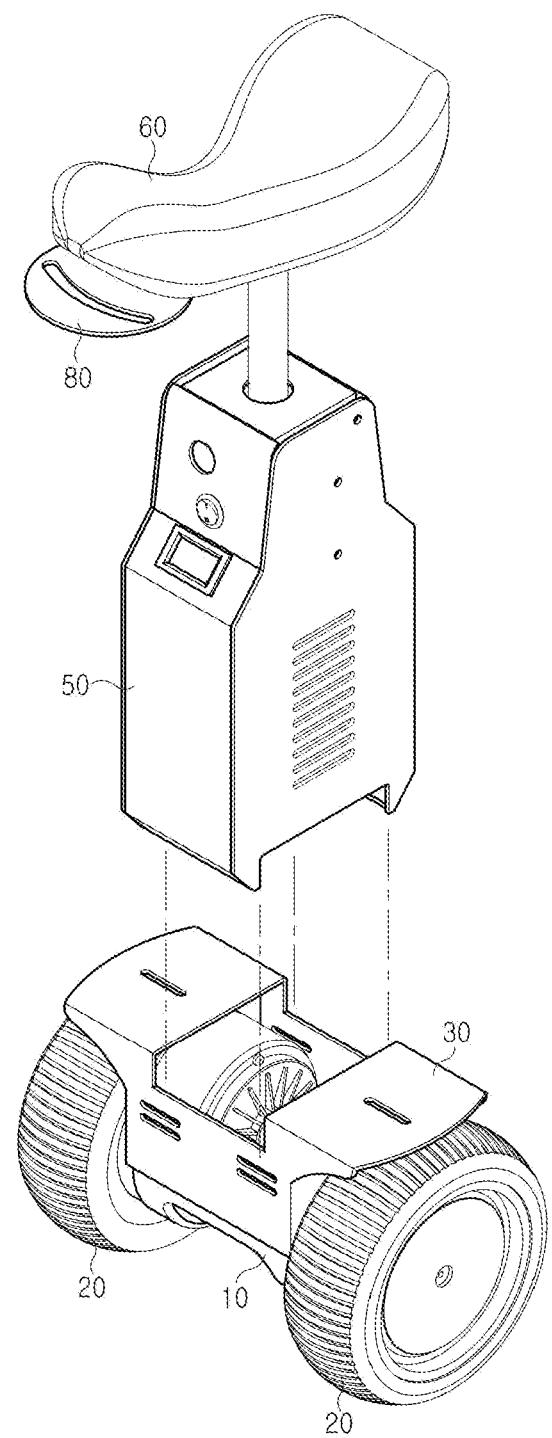
FIG. 8 is a perspective view showing the partially coupled state of the self balancing scooter steered with thighs according to the present invention.
Figure 9:
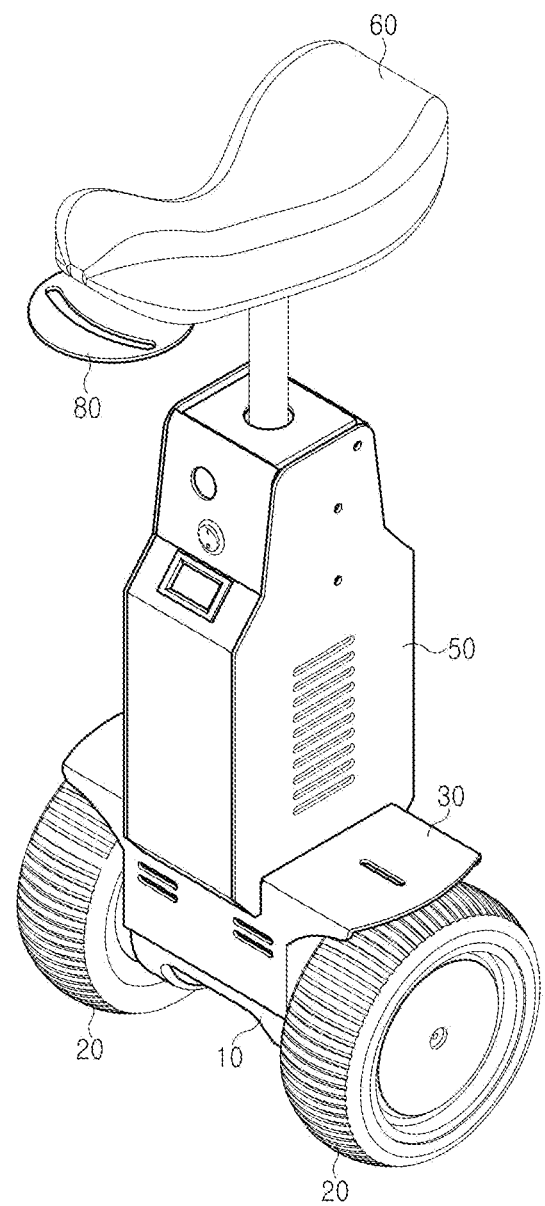
FIG. 9 is a perspective view showing the coupled state of the self balancing scooter steered with thighs according to the present invention.

FIG. 8 is a perspective view showing the partially coupled state of the self balancing scooter steered with thighs according to the present invention, and FIG. 9 is a perspective view showing the coupled state of the self balancing scooter steered with thighs according to the present invention. As shown in FIGS. 8 and 9, if the erecting housing 50 is mounted on top of the footrest 30, the rider's feet are placed on the footrest 30 in the state where he or she sits on the saddle 60, and his or her body is inclined forwardly or backwardly to drive the scooter, while his or her both hands are being freely used.

Further, the rider who sits on the saddle 60 turns the thigh steering plate 80 located between his or her thighs to the left and right sides through his or her thighs, so that as the fitting member 78 of the shuttle gauge 77 cooperatively operated with the movements of the thigh steering plate 80 is turned to the left and right sides, the direction change signal of the shuttle gauge 77 is transmitted along an electric wire to the controller 52 mounted in the erecting housing 50, thus allowing the self balancing scooter to be changed in direction.

As described above, the self balancing scooter steered with thighs according to the present invention is configured wherein the thigh steering plate is manipulated to perform the direction change, while the rider's hands are not being used, so that since the rider can freely use his or her both hands during driving, he or she can take photos, hold objects, or do something.

Further, the self balancing scooter steered with thighs according to the present invention is configured wherein even if the rider has disabilities in hands, he or she can drive the scooter only with the inclination of his or her body, and further, his or her thighs are turned to the left and right sides to manipulate the thigh steering plate, so that the self balancing scooter can be driven easily even by the rider with disabilities in hands.

Furthermore, the self balancing scooter steered with thighs according to the present invention is configured wherein since the fixing shaft and the manipulation handles mounted on top of the fixing shaft to perform the change of direction are basically removed, the whole volume of the scooter can be reduced, so that the scooter can be kept easily in the trunk of a vehicle, thus making it simple in the transportation and storage thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A self balancing scooter steered with thighs, comprising:
- two wheels (20) having motors (21) mounted thereon;
- a motor housing (10) for mounting the motors (21) therein in such a manner as to allow rotary shafts of the motors (21) to be located linearly with respect to one another;
- a footrest (30) disposed on top of the motor housing (10) to place a rider's feet thereon;
- an erecting housing (50) located on top of the footrest (30) and having a battery (51) and a controller (52) mounted therein, the controller (52) being adapted to control driving and direction chancre of the self balancing scooter, a cover (53) disposed on top thereof, and an insertion hole (54) formed on the center of the cover (53);
- a saddle (60) having a seatpost (61) fitted to the insertion hole (54) of the cover (53); and
- a thigh steering plate (80) connected to the saddle (60) via a shuttle gauge (77), a mounting groove (76), a seatpost fixing stand (70), and the seatpost (61) in such a manner as to be turned in left and right sides through the thighs of the rider sitting on the saddle (60) to perform the direction change,
- wherein the thigh steering plate (80) is connected to the saddle (60) in such a manner as to allow the seatpost (61) to be fitted to an insertion hole (71) formed on the center of the seatpost fixing stand (70), to allow a gauge mounting plate (73) to be screw-coupled to two or more first fastening holes (72) of a plurality of first fastening holes (72) formed around the insertion hole (71) of the seatpost fixing stand (70) through bolts (1), to allow the bolts (1) to be passed sequentially through second fastening holes (74) formed on one side of the gauge mounting plate (73) and the first fastening holes (72) of the seatpost fixing stand (70) and screw-coupled thereto, to allow the mounting groove (76) to be formed on the opposite side to the second fastening holes (74) of the gauge mounting plate (73) to mount the shuttle gauge (77) therein, to allow fastening holes (79) to be formed on both sides of the shuttle gauge (77), to allow the fastening holes (79) of the shuttle gauge (77) to be laid on third fastening holes (75) formed on both sides of the mounting groove (76) of the gauge mounting plate (73), to allow bolts (1) to be passed sequentially through the fourth fastening holes (79) and the third fastening holes (75) and screw-coupled thereto, and to allow a fitting member (78) formed on the center of the shuttle gauge (77) to be inserted into a fitting hole (81) formed on one side of the thigh steering plate (80).

* * * * *